Patented May 12, 1942

2,282,928

UNITED STATES PATENT OFFICE 2,282,928

WATER-SOLUBLE CONDENSATION PRODUCTS

Rudolf Bauer, Cologne-Deutz, Germany, assignor, by mesne assignments, to General Aniline & Film Corporation, New York, N. Y., a corporation of Delaware No Drawing. Application April 3, 1939, Serial No. 265,779. In Germany April 9, 1938

15 Claims. (Cl. 260—49)

The present invention relates to new water-soluble condensation products and to processes for preparing the same.

I have found that new water-soluble condensation products are obtained by treating aromatic hydroxy compounds (this term including derivatives thereof) with unsaturated aldehydes or ketones and sulfurous acid or acid salts of sulfurous acid in an acid medium. Other compounds which are capable of linking aromatic nuclei, like for instance, saturated aldehydes and ketones may be present in the mixture, as well as other organic compounds being capable of condensation with the aromatic hydroxy compounds.

The process of preparing these new substances may be carried out in one or several steps and in the latter case in varying order.

As aromatic hydroxy compounds suitable for preparing my new products there may be mentioned, for instance, phenol and its homologues, like cresol and xylenol, substitution products thereof like, for instance, chlorophenols, moreover thiophenols, naphthols, sulfonic acids of aromatic hydroxy compounds and the like; as suitable derivatives there may be mentioned, for instance, the hydroxy alkyl ethers of such compounds. Suitable unsaturated aldehydes and ketones are, for instance, acrolein, croton aldehyde, cinnamic aldehyde, vinylmethylketone, mesityloxide and the like.

As compounds which are capable of linking aromatic nuclei and which may be employed in the preparation of my new products I may mention, for instance, saturated aldehydes and ketones, especially formaldehyde, moreover sulfurmonochloride, carbohydrates and lignin substances. Further compounds capable of being condensed with aromatic hydroxy compounds, which may be present in my reaction, are for instance, sulfonic acids of aromatic hydrocarbons or their derivatives, like for example, naphthalene sulfonic acid, amino compounds like urea and thiourea, arylsulfamides like toluenesulfamide, or their methylol derivatives, moreover substances of natural origin, like for example, lignin sulfonic acid, for instance in the form of sulfite cellulose waste liquor, or tanning extracts like, for instance, quebracho or chestnut extract. Mixtures of the aforementioned substances may also be employed.

In the following, several methods of preparing my new substances are set forth, but only for illustration's sake without in any way limiting my invention thereto.

1. (a) Sulfurous acid is passed into a mixture of the aromatic hydroxy compound and of the unsaturated aldehyde or ketone in water, and the mixture is warmed until the reaction product is water-soluble.

(b) Or the unsaturated aldehyde or ketone is first treated in the presence of water with sulfurous acid or an acid salt thereof and the resulting product is reacted with the aromatic hydroxy compound, if necessary, in the presence of an acid condensing agent.

2. The aromatic hydroxy compound may also be first condensed by means of a substance which is capable of linking aromatic nuclei. The condensation product thus obtained, for example, dihydroxydiphenyldimethylmethane or condensation products of phenols with aldehydes like formaldehyde or with sulfurmonochloride or with carbohydrates or with lignin substances, is then caused to react with the unsaturated aldehyde or ketone and with sulfurous acid.

The water-soluble condensation products thus obtained show the reactions of tanning substances; they precipitate glue and basic dyestuffs and yield with ferric chloride a blue precipitate. The products may be used as starting material for further reactions and also as assistants in the textile and leather industries. The above mentioned method 2 yields directly very valuable tanning agents.

3. Instead of linking up several molecules of the aromatic hydroxy compound before the reaction with the unsaturated aldehyde or ketone and with sulfurous acid according to method 2, the water-soluble condensation products obtainable according to method 1 may also be treated with nucleilinking substances, especially with aldehydes or ketones, if desired in the presence of further compounds being capable of condensation. This reaction is preferably carried out by treating an aqueous solution of the product obtained according to method 1, as such, or after adding the above mentioned further condensing substances, with an aldehyde or ketone, especially with formaldehyde, at temperatures between about 30 and 80° C., until the reaction product is clearly soluble in water, or until the condensation is finished. The products thus obtained, after having been brought to suitable pH-values by addition of ammonia and aromatic acids like acetic acid, formic acid or citric acid, are highly valuable tanning agents. Depending on the starting materials, substances of different tanning action are obtained which will yield leathers of different character, My present invention is of special value if sulfurous acid is employed in preparing my new substances. It is possible in this manner to obtain water-soluble condensation products of aromatic hydroxy compounds being completely free from salts, whereas when rendering condensation products of aromatic hydroxy compounds water-soluble according to usual methods, for instance, by sulfonation, considerable quantities of mineral salts are present, removal of which is very difficult.

My invention is more fully illustrated by the following examples, without being limited thereto, the parts being by weight.

Example 1

95 parts of phenol are mixed with 200 parts of water and with 50 parts of mesityloxide; thereupon sulfurous acid is introduced while cooling and the mixture is warmed to 95° C. After 4 hours the reaction is finished. An aqueous solution of the condensation product is obtained.

Example 2

1500 parts of sulfurous acid are introduced into a mixture of 840 parts croton aldehyde and 2500 parts of water while cooling. 1600 parts of the solution thus obtained are added to 865 parts of crude cresol and the mixture is heated to 95° C. After 3 hours the reaction product is soluble in water.

Example 3

400 parts of the solution of croton aldehyde and sulfurous acid prepared according to Example 2 are added to 250 parts of cresol glycol ether. The mixture is thereupon heated to 95° C. After about 3 hours the condensation product is soluble in water.

Example 4

228 parts of dihydroxydiphenyldimethylmethane are stirred with 300 parts of water, 40 parts of croton aldehyde are added and sulfurous acid is introduced while cooling. The mixture is slowly heated to 90° C. After 4 hours an aqueous solution of the condensation product is obtained.

Example 5

130 parts of sulfurous acid are introduced into a mixture of 132 parts of cinnamic aldehyde and 600 parts of water while cooling and kept standing at room temperature for 10 days, until the cinnamic aldehyde has been dissolved. The thus obtained solution is added to 170 parts of phenol and heated to 95° C. After about 3 hours an aqueous solution of the condensation product is obtained.

Example 6

70 parts of croton aldehyde are dissolved while stirring at room temperature in 550 parts of aqueous sodium bisulfite solution of 38%. 170 parts of phenol are added to this solution and thereupon 130 parts of sulfuric acid of 60° Bé. are slowly added. The mixture is thereupon heated to 90° C. After 3 hours the reaction product is soluble in water.

Example 7

A mixture of 80 parts of croton aldehyde and 800 parts of water is saturated in the cold with sulfurous acid. 210 parts of a condensation product, which is obtained from phenol and formaldehyde, which is obtained by heating 188 parts of phenol and 100 parts of aqueous formaldehyde-solution of 30% with 100 parts of 2.5% hydrochloric acid are added thereto. The mixture is thereupon heated to 90° C. After 3 hours a clear water-soluble sirup of the reaction product is obtained.

Example 8

144 parts of α-naphthol and 40 parts of croton aldehyde in 400 parts of water are treated while stirring with sulfurous acid. The mixture is then heated to 90° C. After about 4 hours an aqueous solution of the reaction product is obtained.

Example 9

70 parts of freshly distilled vinyl methyl ketone are dissolved in 275 parts of aqueous sodium bisulfite solution of 38% while cooling. 170 parts of phenol and 130 parts of sulfuric acid of 60° Bé. are added to the solution. The mixture is warmed to 90° C. The condensation product is precipitated and separated from the salt solution. It is easily soluble in water.

Example 10

140 parts of acrolein are dissolved in 1400 parts of aqueous sodium bisulfite solution of 38% while cooling. 420 parts of phenol and 500 parts of hydrochloric acid (21° Bé.) are added to the solution. When heating to 90°, condensation begins and the product becomes water-soluble.

Example 11

1000 parts of a 48% solution of a sulfite cellulose waste liquor from beechwood which has been freed from lime by a treatment with oxalic acid are treated with 100 parts of cresol and 260 parts of an aqueous solution which has been prepared from 160 parts of water, 40 parts of croton aldehyde and 60 parts of sulfurous acid. The mixture is heated to 80° C. for 5 hours. A condensation product is obtained which is easily soluble in water.

Example 12

530 parts of a 66% aqueous solution of the condensation product obtained according to Example 2 from cresol, croton aldehyde and sulfurous acid are treated at 25° C. with 85 parts of 30% aqueous formaldehyde solution until the formaldehyde has disappeared. When used for tanning, the product yields a white leather.

Example 13

480 parts of a 66% aqueous solution of the condensation product obtained according to Example 2 from cresol, croton aldehyde and sulfurous acid are stirred at 25° C. with 108 parts of crude cresol and 100 parts of formaldehyde. After 24 hours an easily water-soluble sirup is obtained. The solution is brought to pH=3 by adding ammonia and acetic acid. When used for tanning, the product yields a white and well filled leather.

Example 14

480 parts of a 66% aqueous solution of the condensation product obtained according to Example 2 from cresol, croton aldehyde and sulfurous acid, are stirred at 25° C. with 27 parts of urea (dissolved in 27 parts of water) and with 150 parts of 30% aqueous formaldehyde. After 24 hours a clearly water-soluble sirup is obtained. The solution is brought to pH=3 by adding ammonia and acetic acid. On tanning, the product yields a white and full leather.

Example 15

400 parts of a 45% solution of a condensation product prepared according to the method above described under (1) from phenol, croton aldehyde and sulfurous acid are stirred with 15 parts of thiourea and 50 parts of formaldehyde at 30° C. After 6 hours the reaction product has become clearly water-soluble. After having been brought with ammonia and acetic acid to pH=3, the solution can be used for tanning.

Example 16

200 parts of a 45% solution of a condensation product prepared according to the above mentioned method (1) from phenol, croton aldehyde and sulfurous acid are stirred with 31 parts of toluene sulfamide and 31 parts 30% formaldehyde solution at 70° C., until the formaldehyde is used up and the reaction product has become water-soluble. After having been brought with ammonia and acetic acid to a suitable pH value, the solution can be used for tanning.

Example 17

200 parts of a 45% solution of a condensation product prepared according to the method (1) above mentioned from phenol, croton aldehyde and sulfuric acid are stirred with 100 parts of cresol sulfonic acid and 75 parts of formaldehyde-solution at 30° C., until the formaldehyde is consumed. An easily soluble sirup is obtained which can be used for tanning after having been brought to the suitable pH value.

Example 18

1000 parts of a 44% solution of ligninsulfonic acid, which has been prepared by reacting crude pine wood sulfite liquor with sulfuric acid and filtrating from the gypsum, are mixed with 200 parts of a 50% solution of a condensation product obtained according to Example 2 from crude cresol, sulfurous acid and croton aldehyde. 10 g. of the mixture need 15 ccms. 1n-caustic soda solution for neutralization. Thereupon 60 parts of phenol and 70 parts of 30% aqueous formaldehyde are added and the solution is warmed to 40–50° C. The condensation is terminated after 7 hours. An easily water-soluble sirup is obtained, which is brought to pH=3.5 with ammonia and acetic acid. When tanning on cattle hide, the product yields a full leather of light color, which is similar to leather tanned with vegetable tanning extracts. The product tans hides very quickly and thoroughly.

Example 19

300 parts of a 45% solution of a condensation product prepared according to the method (1) above mentioned from phenol, croton aldehyde and sulfurous acid are treated with 50 parts of a 30% formaldehyde solution and with 60 parts of quebracho ordinary, which have been stirred with 100 parts of hot water, and heated to 70 to 80° C. for 3 hours. An easily soluble sirup is obtained which can be employed for tanning after having been brought with ammonia and acetic acid to pH=3.5.

Example 20

500 parts of a 50% aqueous solution of a condensation product prepared according to process 1 from phenol, croton aldehyde and sulfurous acid are heated with 100 parts of phenol and 150 parts of acetone for 8 hours to 110° C. in a closed vessel. The clearly water-soluble condensation product is brought to a suitable pH value and can thus be employed for tanning.

Example 21

In 1280 parts of a 66% aqueous solution of a condensation product prepared according to Example 2 from cresol, croton aldehyde and sulfurous acid, 208 parts of naphthalenesulfonic acid are dissolved while heating and the solution is treated after cooling to 30° C. with 400 parts of a 15% aqueous formaldehyde solution, until the formaldehyde is consumed. By adding ammonia and acetic acid, the reaction product is brought to the pH-value suitable for tanning.

I claim:

1. As new products the water-soluble condensation products from an aromatic hydroxy compound containing phenolic-hydroxyl, an unsaturated carbonyl compound selected from the group consisting of unsaturated aldehydes and ketones, and a member of the group consisting of sulfurous acid and the acid salts thereof, the said condensation products having been prepared by conducting the condensation in an aqueous acid medium until the resulting products are water soluble.

2. As new products the water-soluble condensation products from a condensation product of an aromatic hydroxy compound containing phenolic hydroxyl and of an agent known to be capable of linking aromatic nuclei selected from the class consisting of saturated aldehydes and ketones and sulfur monochloride, an unsaturated carbonyl compound selected from the group consisting of unsaturated aldehydes and ketones, and a member of the group consisting of sulfurous acid and the acid salts thereof, the said water-soluble condensation product having been prepared by conducting the condensation in an aqueous acid medium until the resulting products are water soluble.

3. As new products the water-soluble condensation products from phenol, croton aldehyde and sulfurous acid, the said condensation products having been prepared by conducting the condensation in an aqueous acid medium until the resulting products are water soluble.

4. As new products the water-soluble condensation products from the cresoles, croton aldehyde and sulfurous acid, the said condensation products having been prepared by conducting the condensation in an aqueous acid medium until the resulting products are water soluble.

5. As new products the condensation products from an aromatic hydroxy compound containing phenolic hydroxyl, an unsaturated carbonyl compound selected from the group consisting of unsaturated aldehydes and ketones, and a member of the group consisting of sulfurous acid and the acid salts thereof, the said condensation products having been prepared by conducting the condensation in an aqueous acid medium until the resulting products are water soluble and having been aftertreated with a carbonyl compound selected from the group consisting of aldehydes and ketones, the after-treated products being water-soluble.

6. As new products the condensation products from an aromatic hydroxy compound containing phenolic hydroxyl, an unsaturated carbonyl compound selected from the group consisting of unsaturated aldehydes and ketones, and a member of the group consisting of sulfurous acid and the acid salts thereof, the said condensation products having been prepared by conducting the condensation in an aqueous acid medium until the resulting products are water soluble and having been aftertreated with formaldehyde, the aftertreated products being water-soluble.

7. The process of preparing water-soluble condensation products suitable for tanning which comprises treating an aromatic hydroxy compound containing phenolic hydroxyl with an unsaturated carbonyl compound selected from the group consisting of unsaturated aldehydes and ketones, and with a member of the group consisting of sulfurous acid and the acid salts thereof, in an aqueous acid medium, at least until the resulting product is water-soluble.

8. The process of preparing water-soluble condensation products suitable for tanning which comprises treating a condensation product of an aromatic hydroxy compound containing phenolic hydroxyl and of an agent known to be capable of linking aromatic nuclei selected from the class consisting of saturated aldehydes and ketones and sulfur monochloride with an unsaturated carbonyl compound selected from the group consisting of unsaturated aldehydes and ketones, and with a member of the group consisting of sulfurous acid and the acid salts thereof, in an aqueous acid medium, at least until the resulting product is water-soluble.

9. The process of preparing water-soluble condensation products suitable for tanning which comprises treating a condensation product of an aromatic hydroxy compound containing phenolic hydroxyl and of formaldehyde with an unsaturated carbonyl compound selected from the group consisting of unsaturated aldehydes and ketones, and with a member of the group consisting of sulfurous acid and the acid salts thereof, in an aqueous acid medium, at least until the resulting product is water-soluble.

10. The process of preparing water-soluble condensation products suitable for tanning which comprises treating phenol with croton aldehyde and sulfurous acid in an aqueous acid medium, at least until the resulting product is water-soluble.

11. The process of preparing water-soluble condensation products suitable for tanning which comprises treating the cresols with croton aldehyde and sulfurous acid in an aqueous acid medium, at least until the resulting product is water-soluble.

12. The process of preparing water-soluble condensation products suitable for tanning which comprises treating an aromatic hydroxy compound containing phenolic hydroxyl with an unsaturated carbonyl compound selected from the group consisting of unsaturated aldehydes and ketones with a member of the group consisting of sufurous acid and the acid salts thereof, in an aqueous acid medium, at least until the resulting product is water-soluble, and aftertreating the resulting product with a carbonyl compound selected from the group consisting of aldehydes and ketones.

13. The process of preparing water-soluble condensation products suitable for tanning which comprises treating an aromatic hydroxy compound containing phenolic hydroxyl with an unsaturated carbonyl compound selected from the group consisting of unsaturated aldehydes and ketones with a member of the group consisting of sulfurous acid and the acid salts thereof, in an aqueous acid medium, at least until the resulting product is water-soluble, and aftertreating the resulting product with formaldehyde.

14. The process of preparing water-soluble condensation products suitable for tanning which comprises areating phenol with croton aldehyde and sulfurous acid in an aqueous acid medium, at least until the resulting product is water-soluble, and aftertreating the resulting product with formaldehyde.

15. The process of preparing water-soluble condensation products suitable for tanning which comprises treating the cresols with croton aldehyde and sulfurous acid in an aqueous acid medium, at least until the resulting product is water soluble, and aftertreating the resulting product with formaldehyde.

RUDOLF BAUER.